US009785123B2

(12) United States Patent
Mansour et al.

(10) Patent No.: US 9,785,123 B2
(45) Date of Patent: Oct. 10, 2017

(54) DIGITAL ANALOG DISPLAY WITH ROTATING BEZEL

(71) Applicant: Intel Corporation, Santa Clara, CA (US)

(72) Inventors: Anna-Marie Mansour, Hillsboro, OR (US); Charles E. Johnson, II, Hillsboro, OR (US); Rowland L. Brown, Hilsboro, OR (US); Aaren B. Esplin, Portland, OR (US); Wendy March, Portland, OR (US); Steven T. Holmes, Redwood City, CA (US); Saurabh Dadu, Tigard, OR (US); Michael R. Bynum, Portland, OR (US); Min Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 14/498,819

(22) Filed: Sep. 26, 2014

(65) Prior Publication Data

US 2016/0091867 A1    Mar. 31, 2016

(51) Int. Cl.
*G04B 19/28* (2006.01)
*G04G 21/08* (2010.01)
*G06F 1/16* (2006.01)

(52) U.S. Cl.
CPC ........... *G04G 21/08* (2013.01); *G04B 19/283* (2013.01); *G06F 1/163* (2013.01)

(58) Field of Classification Search
CPC ........ G04C 3/001; G04C 3/005; G04G 21/00; G04G 21/08; G04B 19/283

USPC ..................... 368/10, 69, 204, 295
See application file for complete search history.

(56) References Cited

U.S. PATENT DOCUMENTS

| 4,488,818 | A | * | 12/1984 | Saurer | G04G 9/0094 368/242 |
| 5,107,628 | A | * | 4/1992 | Kondo | B24B 13/06 451/10 |
| 5,559,761 | A | * | 9/1996 | Frenkel | G04G 21/06 368/187 |
| 6,269,054 | B1 | * | 7/2001 | Truini | G04G 9/0082 368/223 |
| 6,407,379 | B1 | * | 6/2002 | Shinbo | G01D 5/2457 250/231.13 |

(Continued)

FOREIGN PATENT DOCUMENTS

CN    101609383 A    12/2009
CN    102196072 A    9/2011

(Continued)

OTHER PUBLICATIONS

International Search Report,PCT No. PCT/US2015/046882, mailed on Nov. 30, 2015, 3 pages.

(Continued)

*Primary Examiner* — Vit W Miska
(74) *Attorney, Agent, or Firm* — International IP Law Group, P.L.L.C.

(57) ABSTRACT

A wearable device is described herein. The wearable device includes a display. The display can be a digital display with analog components. The wearable device also includes an input device. The input device is to control the digital display and the analog components correspond to the digital display. In some cases, the input device is a bezel.

25 Claims, 12 Drawing Sheets

(56) References Cited

U.S. PATENT DOCUMENTS

| | | | | |
|---|---|---|---|---|
| 6,463,011 B1* | 10/2002 | Christen | G04C 3/005 368/69 |
| 6,535,461 B1* | 3/2003 | Karhu | G04C 3/001 368/10 |
| 6,556,222 B1* | 4/2003 | Narayanaswami | G04G 9/0064 368/295 |
| 6,590,835 B2* | 7/2003 | Farine | G04G 17/083 368/10 |
| 6,603,708 B2* | 8/2003 | Tamagawa | G04G 21/00 345/168 |
| 6,751,164 B1* | 6/2004 | Sekiguchi | G04C 3/146 368/21 |
| 7,031,228 B2* | 4/2006 | Born | G04G 21/08 368/230 |
| 7,091,964 B2* | 8/2006 | Wong | G06F 1/1626 345/157 |
| 7,113,450 B2* | 9/2006 | Plancon | G04B 19/082 368/10 |
| 7,215,601 B2* | 5/2007 | Plancon | G04B 19/082 368/10 |
| 7,420,881 B2* | 9/2008 | Frenkel | G06F 1/3228 345/169 |
| 7,907,476 B2* | 3/2011 | Lee | G04G 5/04 345/173 |
| 8,212,781 B2* | 7/2012 | Wong | G06F 1/1626 345/173 |
| 8,824,245 B2* | 9/2014 | Lau | G04G 21/08 368/296 |
| 9,104,180 B2* | 8/2015 | Springer | G04C 17/0091 |
| 9,122,335 B2* | 9/2015 | Corrion | G06F 3/0416 |
| 9,317,016 B2* | 4/2016 | Ruestenberg | G04F 10/00 |
| 2006/0034160 A1 | 2/2006 | Berseth et al. | |
| 2006/0139320 A1* | 6/2006 | Lang | G06F 1/163 345/156 |
| 2006/0170649 A1* | 8/2006 | Kosugi | G04G 21/08 345/156 |
| 2007/0109918 A1 | 5/2007 | Furetta et al. | |
| 2008/0151700 A1* | 6/2008 | Inoue | B60K 37/02 368/80 |
| 2009/0015514 A1* | 1/2009 | Suzuki | B63C 11/02 345/3.1 |
| 2009/0059730 A1* | 3/2009 | Lyons | G04G 21/04 368/69 |
| 2009/0199130 A1* | 8/2009 | Tsern | G04G 21/08 715/810 |

FOREIGN PATENT DOCUMENTS

| | | |
|---|---|---|
| JP | 07-050719 Y2 | 11/1995 |
| JP | 2006014947 A | 1/2006 |
| JP | 2007139789 A | 6/2007 |
| WO | 2004012178 A1 | 2/2004 |

OTHER PUBLICATIONS

Search Report R.O.C. Patent Application No. 104127735, completed on Jun. 20, 2016, 1 page.

\* cited by examiner

200

300

400

400

400

500

800

DIGITAL ANALOG DISPLAY WITH ROTATING BEZEL

TECHNICAL FIELD

The present disclosure relates generally to a wearable device. More specifically, the present techniques relate to a wrist worn device with a defined gestures, a rotating bezel, a digital analog display or any combination thereof.

BACKGROUND ART

Wrist worn devices, such as smart watches, can tend to be small enough to make screen gestures impractical. Moreover, these wrist worn devices tend to have purely analog or digital features and cannot appeal to an analog fashion watch. Additionally, the bezels of watches are for purely aesthetic purposes.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to a wearable device. In particular, the present techniques relate to a wrist worn device with defined gestures, a rotating bezel, a digital analog display or any combination thereof. In embodiments, analog functionality of a traditional mechanical watch is combined with a digital display, software, and interactions such as gestures for added physical interactions with the smart watch. In some cases, a bezel of the watch is rotatable. Additionally, the bezel may receive touch input and can be used to input gestures. Moreover, a band of the watch can also receive touch input and be used to input gestures. In some examples, the wearable device can appear as a mechanical watch form factor.

Figure 1:
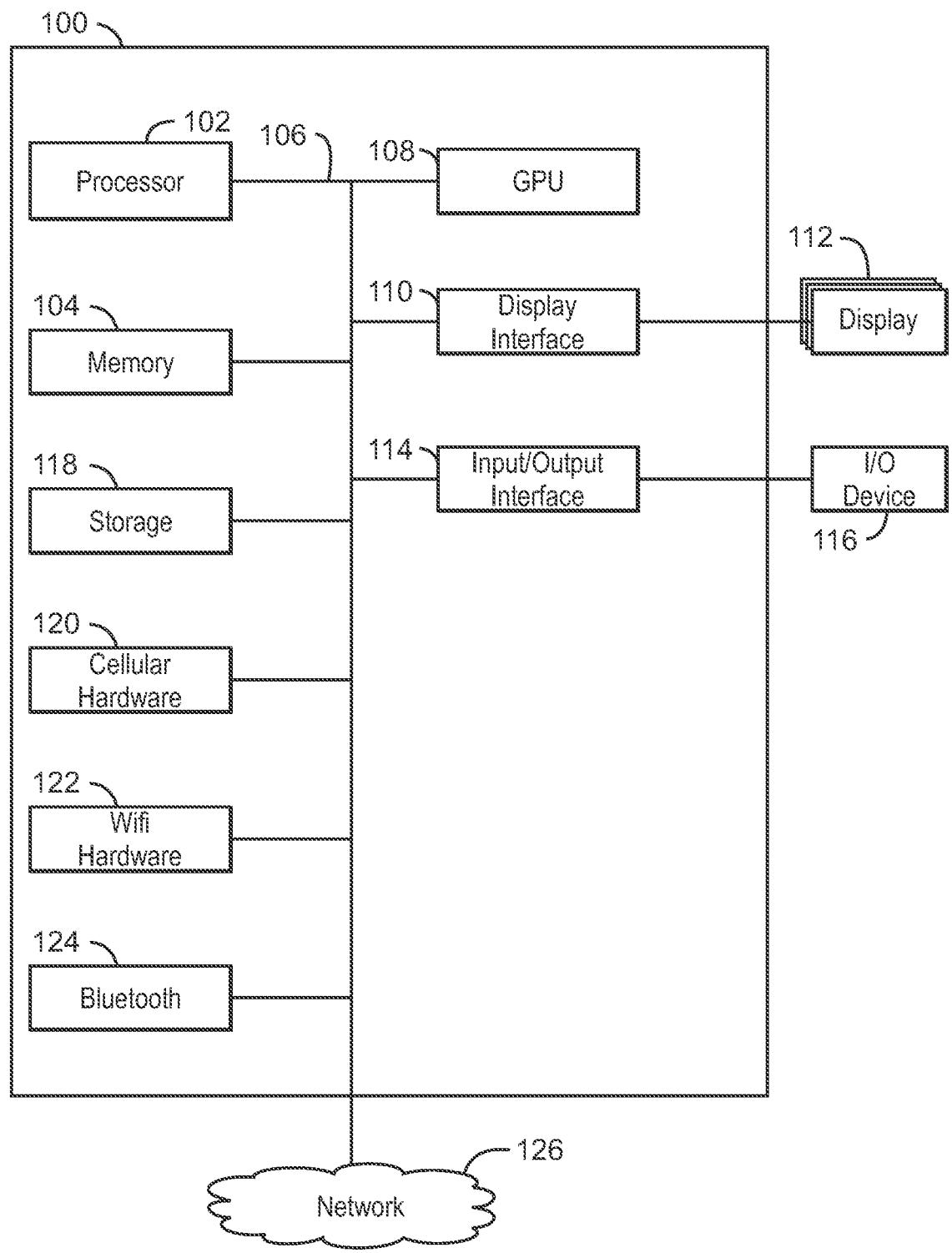
FIG. 1 is a block diagram of a wearable electronic device.

FIG. 1 is a block diagram of a wearable electronic device 100. The wearable electronic device 100 may be, for example, a wrist watch, a pocket watch, or other time piece. The wearable electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the wearable electronic device 100 may include more than one CPU 102. The memory device 104 can include random access memory (RAM), read only memory (ROM), flash memory, or any other suitable memory systems. For example, the memory device 104 may include dynamic random access memory (DRAM).

The wearable electronic device 100 may also include a graphics processing unit (GPU) 108. As shown, the CPU 102 may be coupled through the bus 106 to the GPU 108. The GPU 108 may be configured to perform any number of graphics operations within the wearable electronic device 100. For example, the GPU 108 may be configured to render or manipulate graphics images, graphics frames, videos, or the like, to be displayed to a user of the wearable electronic device 100. In some cases, the GPU 108 can process data for a digital-analog display.

The CPU 102 may be linked through the bus 106 to a display interface 110 configured to connect the wearable electronic device 100 to a plurality of displays 112. In some cases, displays 112 may be an e-ink display. In embodiments, the display interface 110 and the displays 112 are to combine analog features with a digital display. For example, the displays 112 may be digital displays that can display the hours on a watch, while a mechanical set of watch hands are used to indicate the time. In another example, the watch hands are digital watch hands, along with the hours displayed on the watch. Further, in another example, a faceplate is layered on top of the watch display to give the appearance of an analog watch.

The CPU 102 may also be connected through the bus 106 to an input/output (I/O) device interface 114 configured to connect the wearable electronic device 100 to one or more I/O devices 116. The I/O devices 124 may include, for example, a pointing device or a touch screen, among others. The I/O devices 120 may be built-in components of the PC 100. Further, the computing device 100 includes an input/output (I/O) interface 114 that is coupled with an I/O device 116. In some cases, the wearable electronic device 100 is a smart watch with a touch screen display 112 and an I/O device 114 as a rotating bezel. The smart watch may include functioning mechanical rotary bezel 114 and winding stem that can be turned to control one or more digital displays 112 on the watch face. In some examples, one might use the rotation of the bezel to control information displayed through the faceplate layered on the watch display. The faceplate can be configured to show three sub-dials on the watch face. The rotating bezel can be used to change the information shown by the three sub-dials. In embodiments, the three sub-dials are small chronograph type screens. Further, in addition to the stem or bezel, there are other physical mechanics that could be moved to toggle information. For example, a rotating barrel could be located on the wrist strap of the watch. Rotating the barrel could change information displayed by the watch.

The wearable electronic device 100 can also include a storage device 118. The storage device 118 is a physical memory such as a hard drive, an optical drive, a flash drive, an array of drives, or any combinations thereof. The storage device 118 can store user data, such as audio files, video files, audio/video files, and picture files, among others. The storage device 118 can also store programming code such as device drivers, software applications, operating systems, and the like. The programming code stored to the storage device 118 may be executed by the CPU 102, GPU 108, or any other processors that may be included in the wearable electronic device 100.

The CPU 102 may be linked through the bus 106 to cellular hardware 120. The cellular hardware 120 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 126 is a cellular network.

The CPU 102 may also be linked through the bus 106 to WiFi hardware 122. The WiFi hardware is hardware according to WiFi standards (standards promulgated as Institute of Electrical and Electronics Engineers' (IEEE) 802.11 standards). The WiFi hardware 122 enables the wearable electronic device 100 to connect to the Internet using the Transmission Control Protocol and the Internet Protocol (TCP/IP), where the network 126 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 124 may be coupled to the CPU 102 through the bus 106. The Bluetooth Interface 124 is an interface according to Bluetooth networks (based on the Bluetooth standard promulgated by the Bluetooth Special Interest Group). The Bluetooth Interface 124 enables the wearable electronic device 100 to be paired with other Bluetooth enabled devices through a personal area network (PAN). Accordingly, the network 126 may be a PAN. Examples of Bluetooth enabled devices include a laptop computer, desktop computer, ultrabook, tablet computer, mobile device, or server, among others.

In embodiments, the wearable device 100 is a smart watch that functions as a stand alone phone. More specifically, the wearable device 100 can access the internet, cellular networks, and the like without being tethered to a phone or other mobile device. Moreover, the wearable device can include hardware to track fitness metrics. For example, the wearable device 100 may include a pedometer, heart rate calculator, altimeter, GPS, and the like.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. For example, the wearable electronic device 100 may include audio processing, speakers, microphones, cameras, and the like. Moreover, any of the functionalities of the wearable electronic device 100 can be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 2:
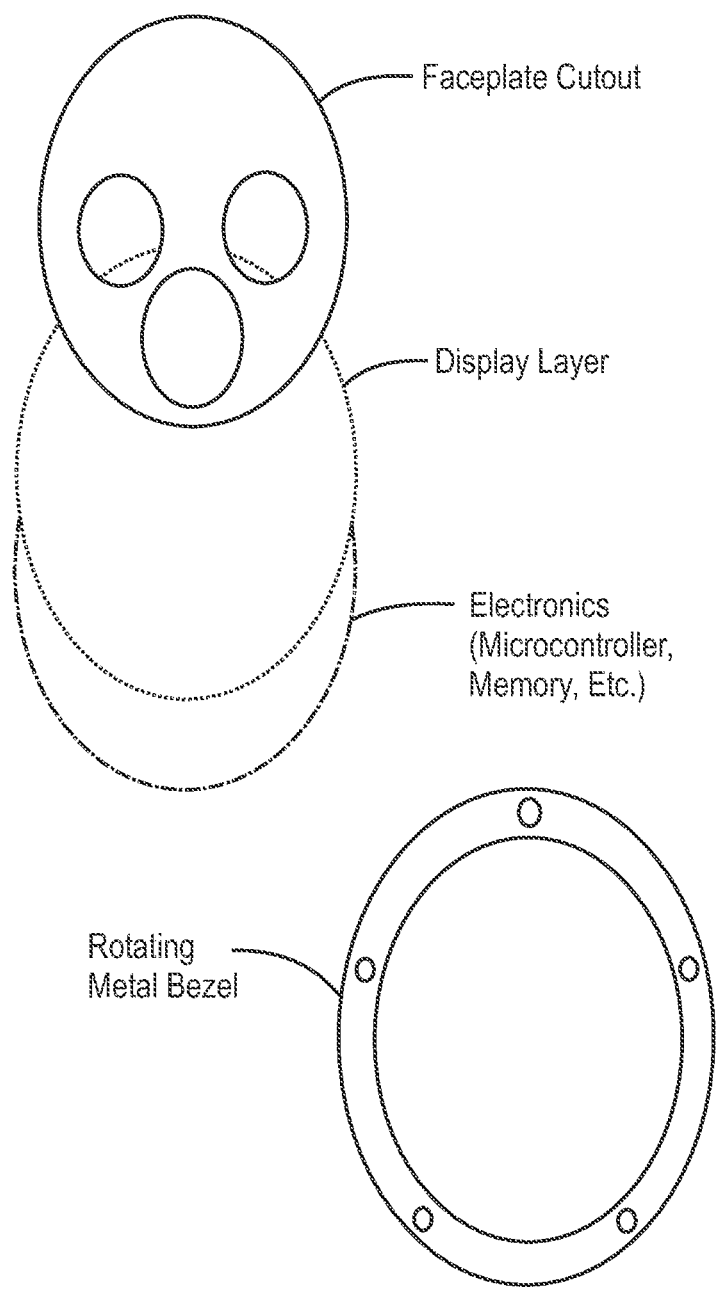
FIG. 2 is an illustration of a portions of a smart watch.

FIG. 2 is an illustration of a portions of a smart watch 200. As discussed above the wearable device 100 may be a smart watch, such as the smart watch 200. The smart watch 200 includes a faceplate 202, display layer 204, electronics layer 206, and a rotating bezel 208. As illustrated, the faceplate 202 is to enable up to three sub-dials to be present on the face of the smart watch 200. The three sub-dials can display any information, such as stocks, game scores, fitness information, and the like. Although three sub-dials are illustrated, any number of sub-dials may be present. Further, other cutouts may be used, such as a rectangular, oval, or square cutout for displaying information.

The information is displayed via the display layer 204. The display layer 204 may be a display 112 as described with respect to FIG. 1. The electronics layer 206 may be connected to the display layer to enable the display of user information. The rotating bezel 208 can be used to change or toggle between the information displayed via the sub-dials 210. In some cases, the bezel is a touch surface.

In examples, the faceplate 202 is an ornamental faceplate that sits on top of a display 112. The display 112 may be an e-ink display, an LED display, or the like. The electronics layer 206 includes components that enable operation of the display 112. The display 112 be a custom size, or custom with a hole in it to accommodate physical watch hands. The rotating bezel 208 may be a ring surrounding the faceplate 202 and the display layer 112, and is to connect to the electronics layer 206 so that rotating the bezel would have an effect on the display. In some cases, the bezel can include LEDs on the bezel, such as a jewel LED or a laser LED.

Figure 3:
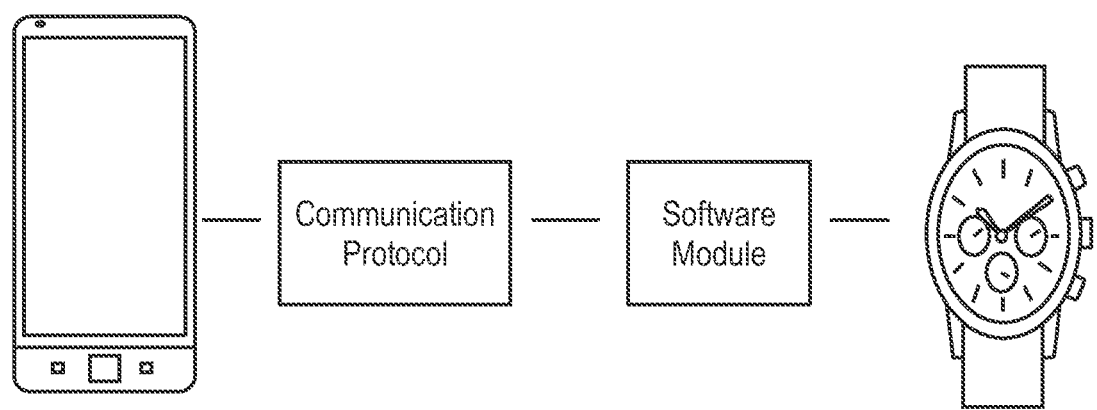
FIG. 3 is a block diagram of a system including a smart watch.

FIG. 3 is a block diagram of a system 300 including a smart watch. In the system 300, a smart watch 302 may be linked to a mobile device 304. Each of the smart watch 302 and the mobile device 304 may communicate via a communication protocol 306 and a software module 308. The communication protocol 306 may be according to Bluetooth or Bluetooth Smart. Although a single software module 308 is illustrated, the communication protocol may be enabled by a combination of hardware modules and software module of both the smart watch 302 and the mobile device 304. Moreover, although the smart watch is illustrated as in communication with a mobile device 304, the smart watch 302 can be implemented as a standalone device.

Figure 4A:
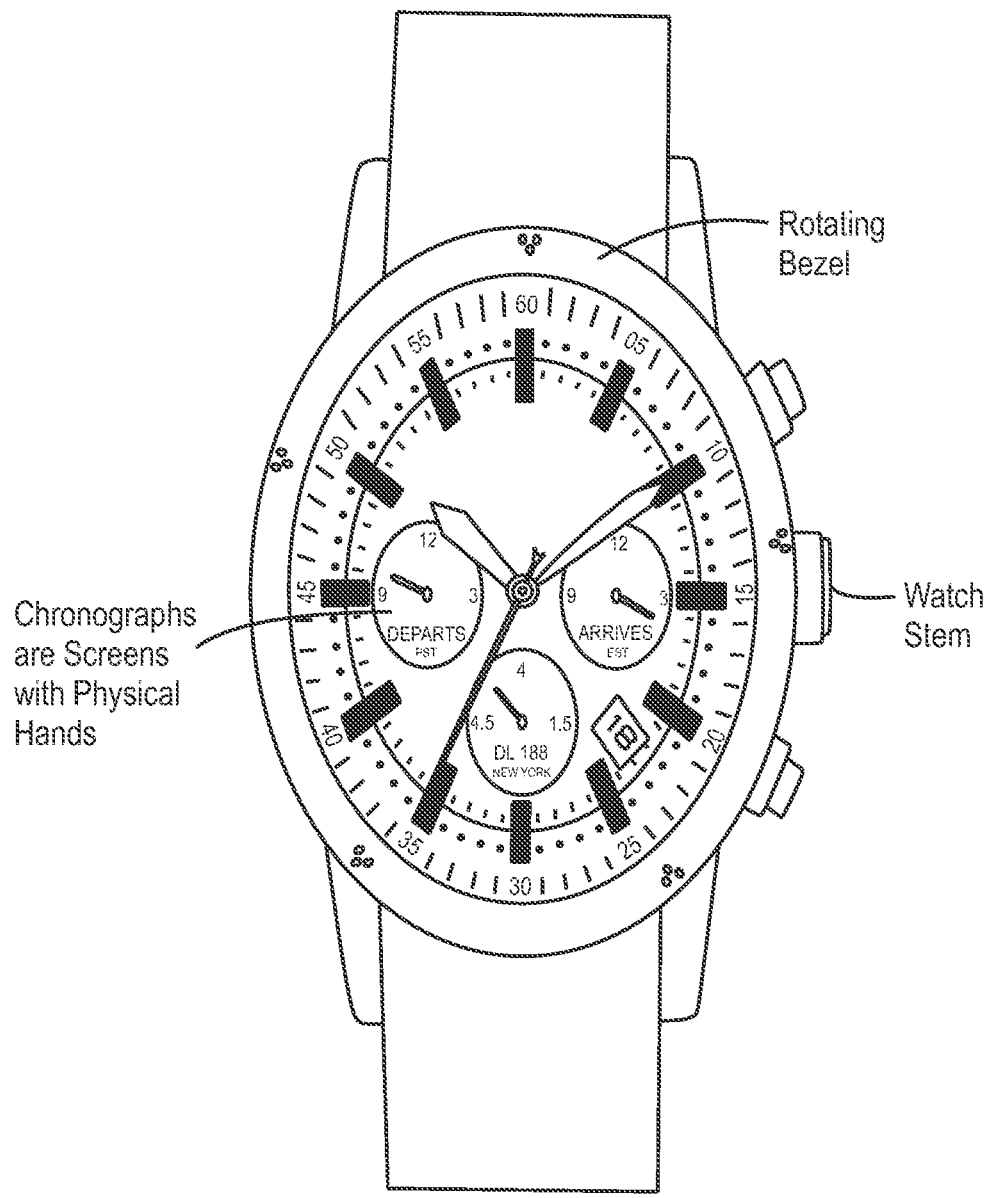
FIG. 4A is an illustration of a smart watch displaying flight information.
Figure 4B:
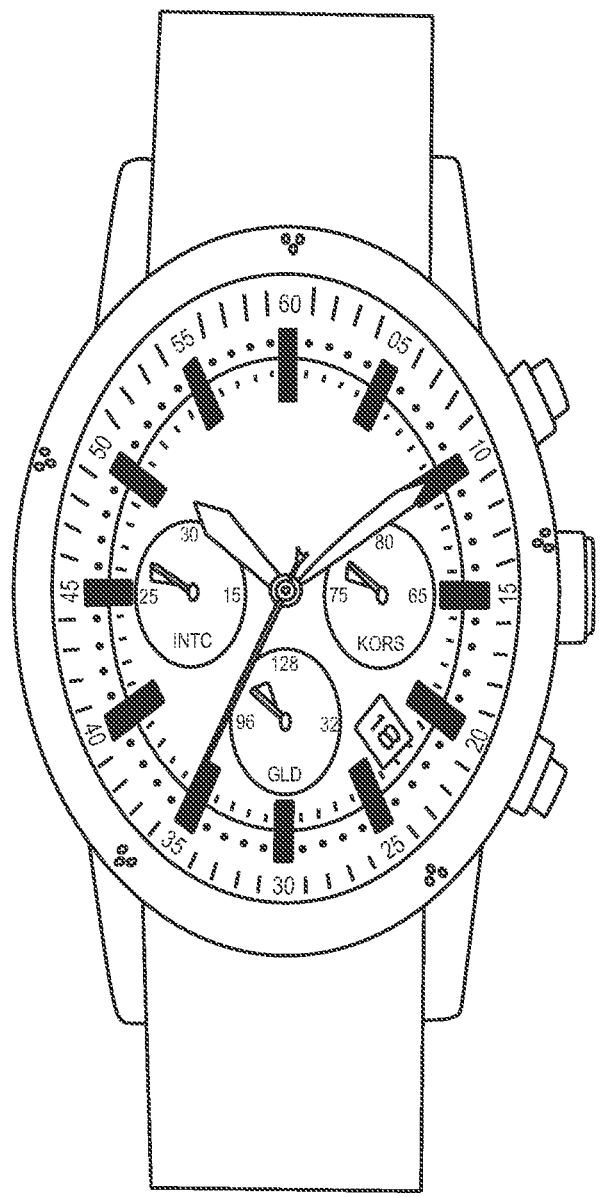
FIG. 4B is an illustration of the smart watch displaying stock information.
Figure 4C:
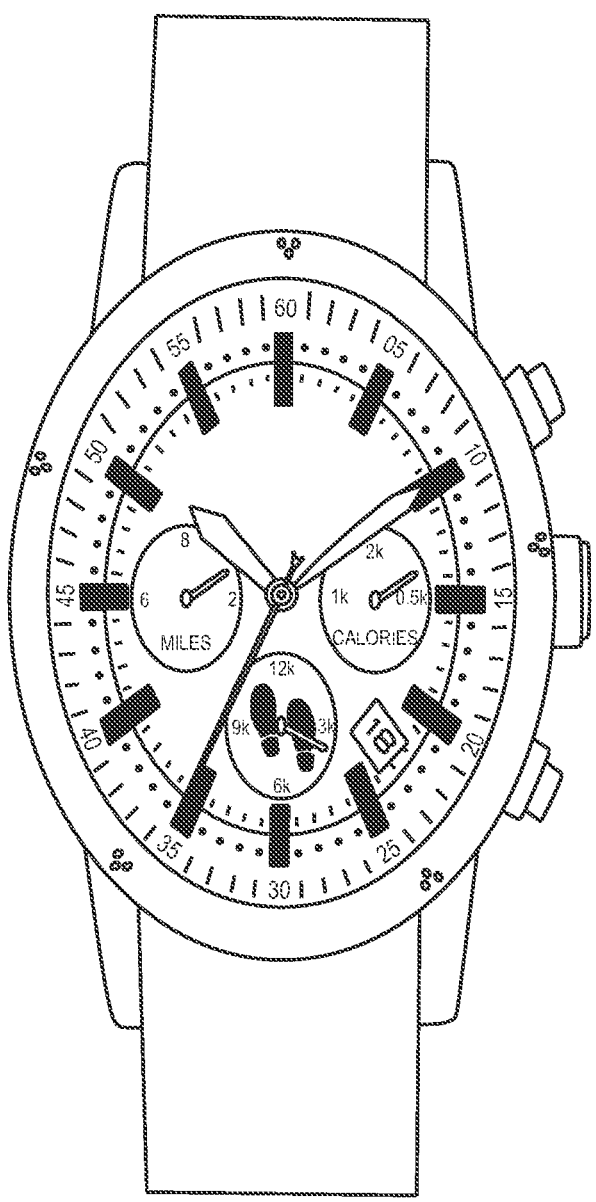
FIG. 4C is an illustration of the smart watch displaying fitness information.
Figure 4D:
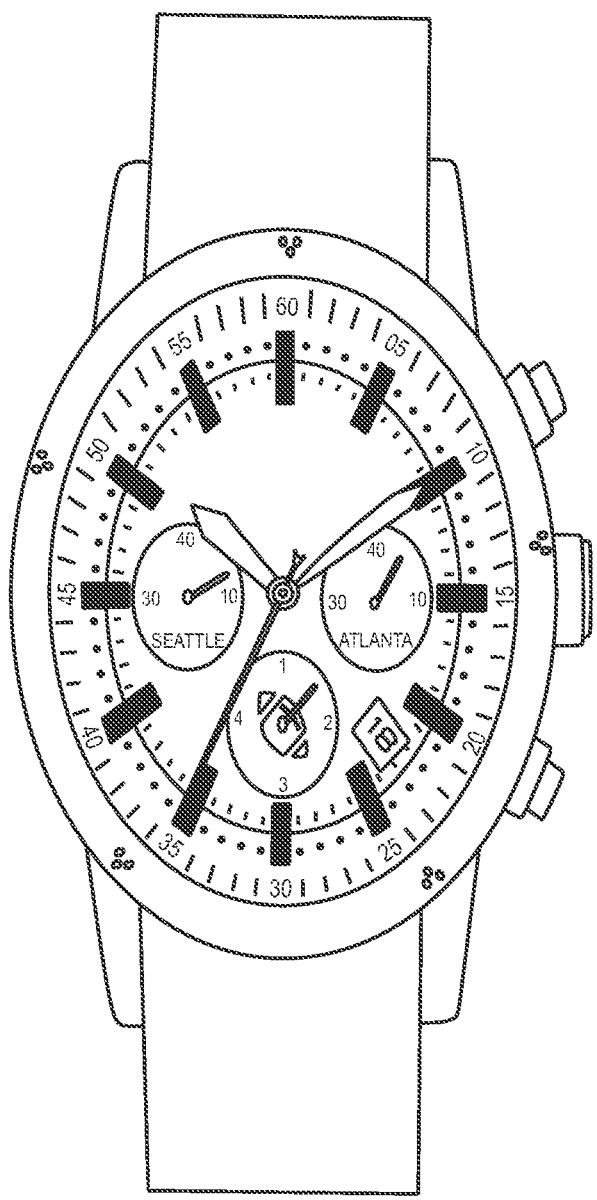
FIG. 4D is a smart watch with a rotating bezel displaying sporting information.

FIG. 4A is an illustration of a smart watch 400 displaying flight information. The smart watch 400 includes a rotating bezel 402 and a watch stem 404. Two additional buttons 406 and 408 a present on the edge of the smart watch 400. Moreover, the smart watch 400 includes three sub-dials 410A, 410B, and 410C. In FIG. 4A, the sub-dials 410A, 410B, and 410C are displaying flight information. FIG. 4B is an illustration of the smart watch 400 displaying stock information. As illustrated in FIG. 4B, the sub-dials 410A, 410B, and 410C are displaying stock information. Further, FIG. 4C is an illustration of the smart watch 400 displaying fitness information. As illustrated in FIG. 4C, the sub-dials 410A, 410B, and 410C are displaying fitness information. In particular, the sub-dials 410A, 410B, and 410C display miles traveled, steps taken, and calories burned. Additionally, FIG. 4D is a smart watch 400 with a rotating bezel displaying sporting information. As illustrated in FIG. 4D, the sub-dials 410A, 410B, and 410C are displaying sporting information.

A plurality of user settings can be enabled using the bezel of a watch as described herein. For example, turning the bezel can result in a change of information mode on displays. Turning the bezel can also enter alphanumeric content, change settings such as (vibrate, on, off etc. In some cases, turning the bezel clockwise and counter-clockwise can result in different inputs to the smart watch. Further, discrete turning of a stem of the smart watch can change information within one mode. In some cases, turning the bezel is combined with turning the stem. Continuous stem turning can fine tune settings such as volume and brightness of the display of the smart watch. Pressing the stem or other buttons on the smart watch may control Discrete functions, such as power off and power on. In some cases, settings can be set on a mobile device when the smart watch is coupled with a mobile device.

In embodiments, the bezel of the smart watch can be used as an interaction surface on the smart watch. An interaction surface, as used herein, is a surface that can capture gestures as data input to the smart watch. Traditional solutions for user interaction on smart watches typically use physical buttons or a touch screen. However, physical buttons are clunky, hard to operate due to small size, and typical physical buttons do not allow flexibility of assigning multiple gestures to the same button. A touch screen can be used to detect multiple types of gestures such as swipes in different directions, taps, and the like. However, the finger occludes most of the screen on a smart watch during the gesture, thus blocking a majority of the screen from view, while not being user friendly. Additionally, the smaller screen found on wearable time pieces does not allow long gestures and user may have to repeat the gesture multiple times for scrolling down, for an example. As used herein, a long gesture refers to the length of time that is used to complete one gesture. Moreover, multi-touch gestures are harder to complete on a small size screen, as the space to complete such gestures is limited. Further, typical touch screens do not include tactile feedback.

However, using the bezel as an interaction surface on smart watches provides some space for gestures while enabling gestures that do not occlude the display screen. For example, a user can slide up/down and around on a bezel for equivalent of swipe interactions on a touch screen. By enabling gestures along the perimeter of the bezel, longer gestures are able to be captured. Moreover, the bezel can detect taps on its surface, as well as the location of the tap. Further, the bezel may provide tactile feedback.

In a example use case with the bezel as a touch surface, a user can set the time by tapping a location on the bezel that is nearest the location where the hour hand of the watch should point. The user can then tap a second time at a location on the bezel nearest to where the minute hand of the watch should point. The bezel can then be rotated to fine-tune the exact time. In embodiments, the bezel may include a slide that can be used to fine tune the time. For example, if a user wants to set the time to 6:07, the user would first tap near the six hour mark to set the hour to six. Then the user would tap near the seven minute mark. However, it is likely that the tap at the seven minute mark would be imprecise. The bezel may include a physical rotating slide or a touch sensor slide that enables the user to fine to the minute mark in this scenario. In another use case, scrolling around the bezel is a gesture used to produces a continuous scrolling motion, but swiping along one edge could scroll one screen at a time. A faster scroll around the bezel can move the screen faster and the application can even skip multiple screens to move the scrolling faster. These types of gestures may be useful in a chat application with many messages, contact lists, music libraries, and any other content which may have long lists of data.

Several gestures are possible using the multi-touch bezel. For example, bringing two fingers on the bezel closer can indicate a zoom out, while moving fingers away on the bezel means zoom in. Putting two fingers on opposite sides of the bezel running fingers along the bezel as if physically rotating the bezel can rotate the screen. Using two fingers to tap on opposite sides of the bezel can be used by an application as a gesture to confirm an action. This gesture to confirm an action can reduce the accidental taps on one end of the bezel. In embodiments, the gestures may be stored in a database to be matched with touch input. The database may also include a particular task linked to each gesture.

Bezel touch detection can also be combined with touch detection on the wrist-band and touch screen of the wearable device. In this manner, new gestures can be interpreted and false gestures can be reduced. For example, touching wristband the with one finger while running a second finger clockwise on the bezel may causes the an application to advance to the end of a list, no matter how long the list is. Similarly, a counter-clockwise rotation can causes the application to advance to the top of the list. Touching the wristband with one finger while taping on the bezel could be interpreted as press and hold gesture. This gesture could also be used for multiple selections, or for changing the bezel functions such as changing the interpretation of positional tap from 1, 2, 3 etc to a set of symbols. In another example, a user can place one finger on the bezel while using the other finger on the touch screen for gestures concerns to reduce about false single-finger gestures on the touch screen. Further, in some cases, sliding a finger from the bezel to the touch screen cause a menu to appear. The direction of the movement from the bezel to the touch screen can indicate the type of menu that appears.

Accordingly, the rotating bezel can controls information shown on the display of the wearable device. Further, the rotating bezel can control settings or modes of the device. Moreover, the rotating bezel can be used to input information, such as alphanumeric content. Further, the physical chronograph may be included on the watch to point to information on the digital display.

Figure 5:
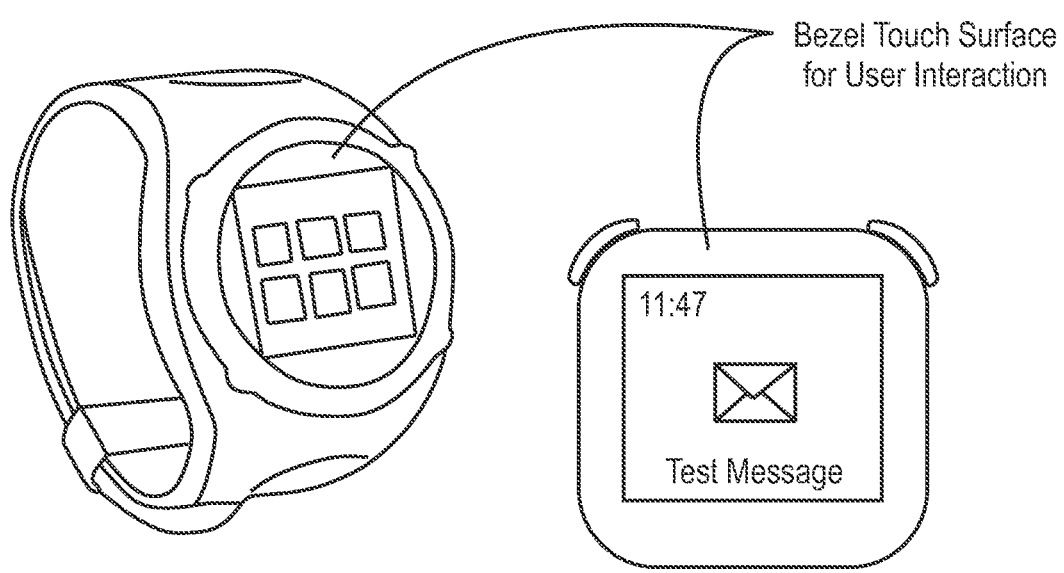
FIG. 5 is an illustration of two smart watches with a touch bezel.

FIG. 5 is an illustration 500 of two smart watches with a touch bezel. The smart watch 502 includes a touch bezel 504 that is clearly distinguished from the touch screen 506. The smart watch 508 includes a touch bezel 510 that appears as one unit with the touch screen 512. Each of the bezel 504 and the bezel 510 can be a touch interaction surface. Moreover, in some embodiments, the bezel 504 and the bezel 510 can be rotatable. Each of the bezel 504 and the bezel 510 can detect the slide of a finger along the bezel. The bezel 504 and the bezel 510 can also detect the direction and the speed of the slide. Also, each of the bezel 504 and the bezel 510 can detect taps, including the location of the tap on the bezel. Moreover, each of the bezel 504 and the bezel 510 can detect a multi-finger touch on bezel. The watches can combine touch interaction on bezel with that on wristband and touch screen to enable new gestures. The bezel interaction surface enables a rich set of gestures that are very intuitive, and when combined with known touch interfaces such as touch screen or wristband, it provides even richer interaction and improves the detection accuracy of gestures.

Figure 6:
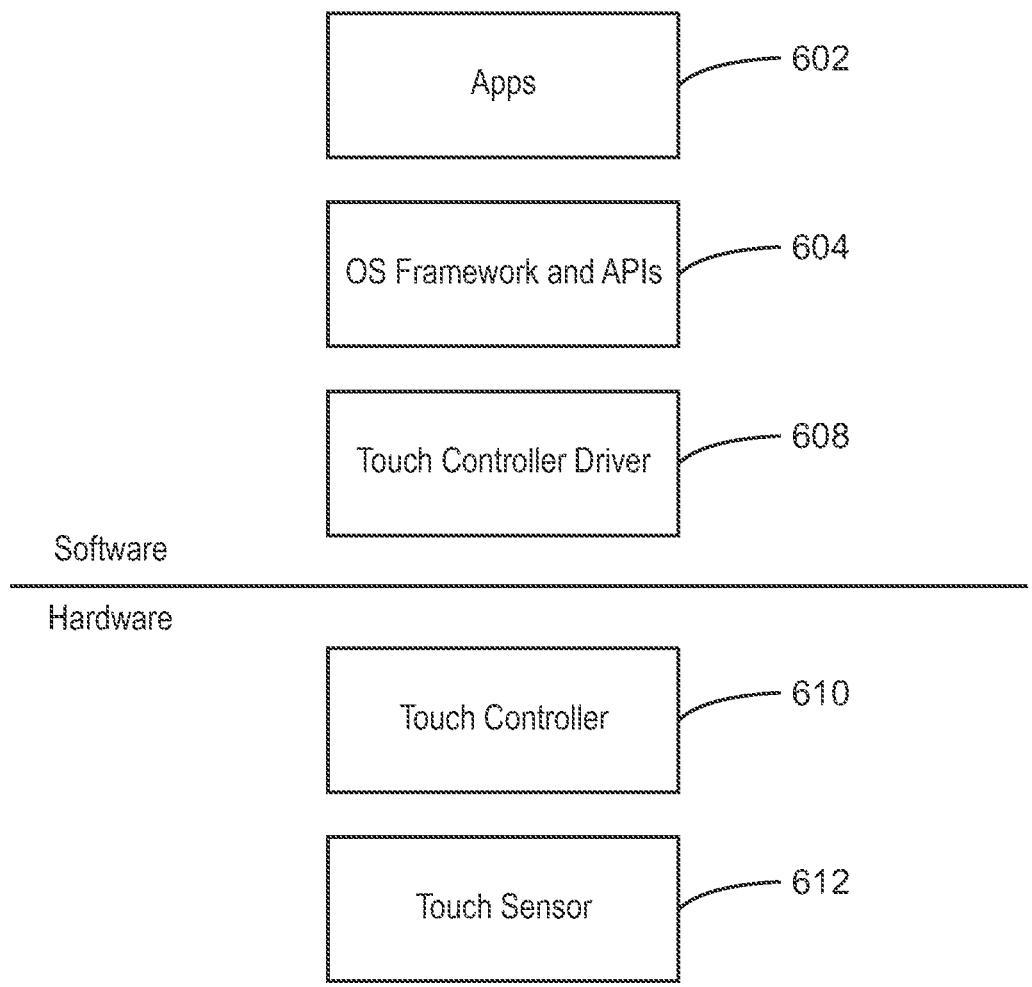
FIG. 6 is a block diagram of components of a smart watch.

FIG. 6 is a block diagram of components of a smart watch. Applications 602 can provide functionality for a user. The apps 602 may include a may be downloaded using a network, such as the network 126 (FIG. 1). The apps can be used to customize the device. For example, a user can download apps so that certain types of data and notifications can be accessed by the wearable device 100. The apps 602 execute in conjunction with an operating system (OS) framework and several application programming interfaces (APIs) 604. In some cases, the OS framework manages the hardware resources 616 and software resources 614 and enables common services for a plurality of apps 602.

A touch controller driver 608 enables interaction with hardware devices of the smart watch 600, such as the touch controller 610 and the touch sensor 612. The touch controller 610 receives data from the touch sensor 612. For example, a touch sensor 612 may be located along the bezel of a smart watch. The touch sensor 612 sends data to the touch controller 610 which is then processed by the smart watch software 614.

Figure 7:
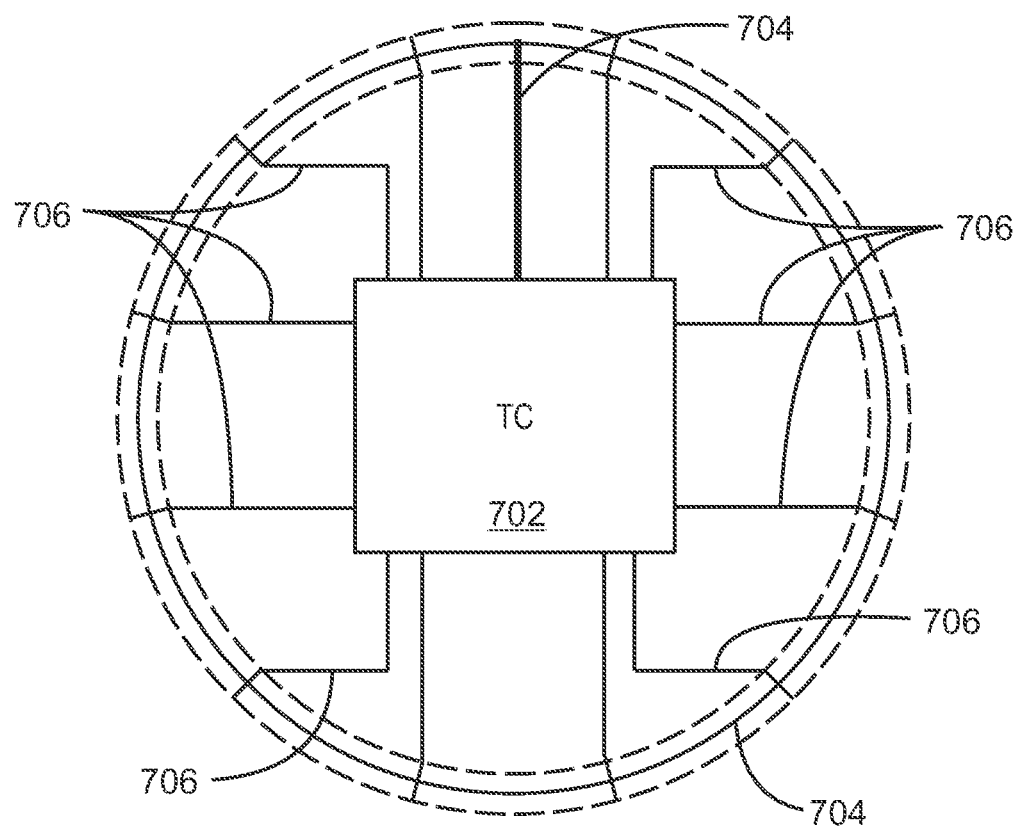
FIG. 7 is a proposed hardware implementation.

FIG. 7 is a proposed hardware implementation 700 of a touch controller 702. The touch controller 702 is a capacitive touch sensor controller and connects to a transmit signal line 704 and several sense receive signals 706 placed at regular intervals under a surface of the bezel. The surface of the bezel may be outlined by the set of dashed lines. From this set of sensing signals, the touch controller 702 can use standard touch sensing algorithms to determine where one or more fingers are located along the bezel and transmit this data to the watch's main processor. Although a finite number of sense receive signals 706 are illustrated, any number of sense receive signals may be present in the device.

Figure 8:
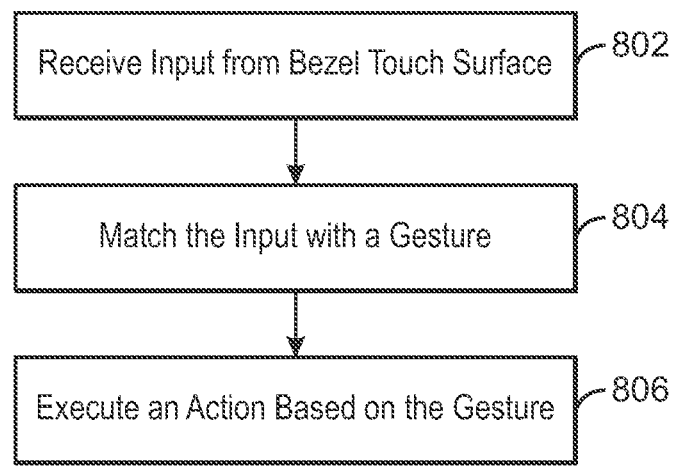
FIG. 8 is a process flow diagram of a method to obtain input from a bezel touch surface.

FIG. 8 is a process flow diagram of a method to obtain input from a bezel touch surface. At block 802, input is received from a bezel touch surface. In some embodiments, the bezel touch surface is a rotatable bezel touch surface. At block 804, the input is matched with a gesture. In some embodiments, a plurality of gestures are stored and matched to the input. At block 806, an action is executed based on the particular gesture. In embodiments, the action is output on a display of the smart watch. The action may also be output by a speaker or vibration of the smart watch.

Figure 9:
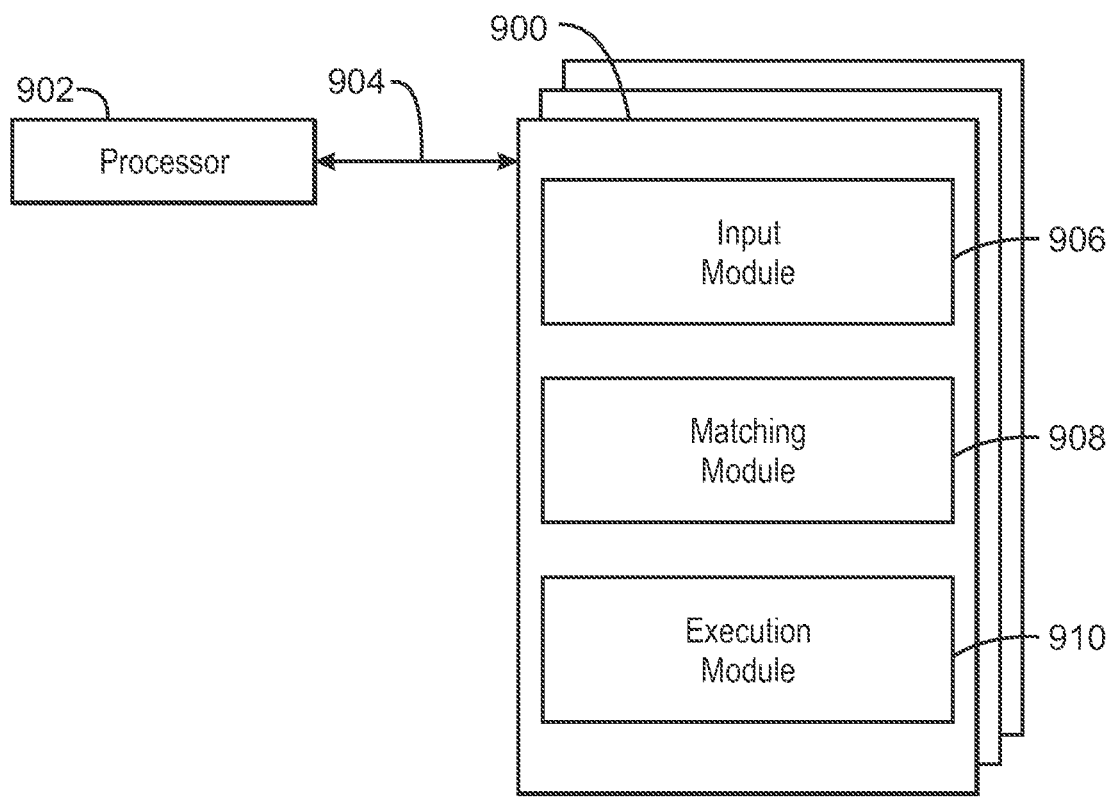
FIG. 9 is a block diagram showing a medium that contains logic for obtaining input from a touch surface.

FIG. 9 is a block diagram showing a medium 900 that contains logic for obtaining input from a touch surface. The medium 900 may be a computer-readable medium, including a non-transitory medium that stores code that can be accessed by a processor 902 over a computer bus 904. For example, the computer-readable medium 900 can be volatile or non-volatile data storage device. The medium 900 can also be a logic unit, such as an Application Specific Integrated Circuit (ASIC), a Field Programmable Gate Array (FPGA), or an arrangement of logic gates implemented in one or more integrated circuits, for example.

The medium 900 may include modules 906-910 configured to perform the techniques described herein. For example, a input module 906 may be configured to receive input from a bezel touch surface. A matching module 908 may be configured to match an input with a gesture. An execution module may be configured to execute an action based on the gesture.

The block diagram of FIG. 9 is not intended to indicate that the medium 900 is to include all of the components shown in FIG. 9. Further, the medium 900 may include any number of additional components not shown in FIG. 9, depending on the details of the specific implementation.

Example 1

A wearable device is described herein. The wearable device comprises a display, wherein the display is a digital display with analog components. The wearable device also comprises an input device, wherein the input device is to control the digital display and analog components of the correspond to the digital display.

The input device may be a rotating bezel. The wearable device may be a standalone smart watch. The display may be coupled with a faceplate, and the faceplate is configured for at least one sub-dial. The at least one sub-dial may be configured to display user-defined information. The analog components may be at a least one hour hand and a one minute hand. The input device may be a bezel, a touch screen, and wrist strap, or any combination thereof. The input device may be a bezel, with LEDs on the bezel. The wearable device may be coupled with a mobile device. The wearable device may be a pocket watch.

Example 2

A wearable device is described herein. The wearable device comprises a display. The wearable device also comprises a bezel touch surface, wherein the bezel touch surface is to detect gestures that are inputs to the wearable device.

The bezel touch surface may be a rotating bezel. The wearable device may be a standalone smart watch. The display may be coupled with a faceplate, and the faceplate is configured for at least one sub-dial. The wearable device may comprise a touch screen, and a touch wrist strap. The touch screen, the touch wrist strap, and the bezel touch surface may input gestures. The gestures may not occlude the touch screen. The touch screen may output tactile feedback. The bezel touch surface may detect multi-finger touch. The wearable device may be coupled with a mobile device. The wearable device may be a pocket watch.

Example 3

A wearable device is described herein. The wearable device comprises a display, wherein the display is a digital display with analog components. The wearable device also comprises a bezel touch surface, wherein the bezel touch surface is to rotatably attach to the wearable device and is to detect gestures that are inputs to the wearable device.

The wearable device may be a standalone smart watch. The display may be coupled with a faceplate, and the faceplate may be configured for at least one sub-dial. The digital display may be configured to display at least one sub-dial. The wearable device may comprise a touch screen. The wearable device may also comprise a touch wrist strap, wherein the touch screen, the touch wrist strap, and the bezel touch surface are to input gestures. The gestures may not occlude the touch screen. The bezel touch surface may output tactile feedback. The bezel touch surface may detect multi-finger touch. The wearable device may be coupled with a mobile device. The wearable device may be a pocket watch.

Example 4

A system is described herein. The system comprises a wearable device, wherein the wearable device includes a digital display with analog components and a bezel touch surface that is to rotatably attach to the wearable device. The system also comprises a mobile device, wherein the mobile device is coupled with the wearable device.

The wearable device may be a smart watch. The display may be coupled with a faceplate, and the faceplate may be configured for at least one sub-dial. The digital display may be configured to display at least one sub-dial. The system may comprise a touch screen. The system may also comprise a touch wrist strap, wherein the touch screen, the touch wrist strap, and the bezel touch surface are to input gestures. The gestures may not occlude the touch screen. The touch screen and the bezel touch surface may output tactile feedback. The bezel touch surface may detect multi-finger touch. The wearable device may be coupled with a mobile device. The wearable device may be a pocket watch.

Example 5

A method is described herein. The method comprises receiving input from a rotatable bezel touch surface of a wearable device and matching the input with a gesture. The method also comprises executing an action based on the gesture.

The gesture may be a multi-touch gesture. The input may be received from the touch detection on a wrist-band and a touch screen of the wearable device. The gesture may be along the perimeter of the bezel touch surface. The gesture and action may be stored in a database.

Example 6

An apparatus is described herein. The apparatus comprises a display, wherein the display is a digital display with analog components. The apparatus also comprises a means to input data, wherein the means to input data is to attach to the wearable device and is to detect gestures that are inputs to the wearable device.

The apparatus may be a standalone smart watch. The display may be coupled with a faceplate, and the faceplate may be configured for at least one sub-dial. The digital display may be configured to display at least one sub-dial. The apparatus may comprise a touch screen. The apparatus may also comprise a touch wrist strap, wherein the touch screen, the touch wrist strap, and the means to input data are to input gestures. The gestures may not occlude the touch screen. The touch screen and the bezel touch surface may output tactile feedback. The bezel touch surface may detect multi-finger touch. The apparatus may be coupled with a mobile device. The apparatus may be a pocket watch.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wearable device, comprising:
   a display, wherein the display is an electronic display with analog components;
   an interaction surface to capture gestures as input;
   an input device, wherein the input device is to control the electronic display and the analog components corresponding to the electronic display, and the input device is to toggle information displayed on the electronic display within a plurality of sub-dials, wherein a gesture comprises one finger on the input device and a second finger on the interaction surface to reduce false single-finger gestures.

2. The wearable device of claim 1, wherein the input device is a rotating bezel.

3. The wearable device of claim 1, wherein the wearable device is a standalone smart watch.

4. The wearable device of claim 1, wherein the display is coupled with a faceplate, and the faceplate is configured for at least one sub-dial.

5. The wearable device of claim 4, wherein the at least one sub-dial is configured to display user-defined information.

6. The wearable device of claim 1, wherein the analog components are a least one hour hand and one minute hand.

7. The wearable device of claim 1, wherein the input device is a bezel, a touch screen, and wrist strap, or any combination thereof.

8. A wearable device, comprising:
   a touch screen;
   a bezel touch surface, wherein the bezel touch surface is to detect gestures that are inputs to the wearable device, wherein a gesture comprises one finger on the bezel touch surface and a second finger on the touch screen to reduce false single-finger gestures on the touch screen; and a wristband, wherein the wristband is to detect gestures that are inputs to the wearable device that do not occlude the touch screen.

9. The wearable device of claim 8, wherein the bezel touch surface is a rotating bezel.

10. The wearable device of claim 8, wherein the wearable device is a standalone smart watch.

11. The wearable device of claim 8, wherein the display is coupled with a faceplate, and the faceplate is configured for at least one sub-dial.

12. The wearable device of claim 11, comprising:
a touch screen; and
a touch wrist strap, wherein the touch screen, the touch wrist strap, and the bezel touch surface are to input gestures.

13. The wearable device of claim 8, wherein bezel touch surface is to detect multi-finger touch.

14. The wearable device of claim 8, wherein the wearable device is coupled with a mobile device.

15. The wearable device of claim 8, wherein the wearable device is a pocket watch.

16. A wearable device, comprising:
a display, wherein the display is a digital display with analog components;
an interaction surface to capture gestures as input;
a bezel touch surface, wherein the bezel touch surface is to rotatably attach to the wearable device and is to detect gestures that are inputs to the wearable device, wherein a rotation of the bezel touch surface is used to toggle information displayed on the digital display in a plurality of sub-dials and at least one gesture comprises one finger on the bezel touch surface and a second finger on the interaction surface to reduce false single-finger gestures.

17. The wearable device of claim 16, wherein the wearable device is a standalone smart watch.

18. The wearable device of claim 16, wherein the display is coupled with a faceplate, and the faceplate is configured for at least one sub-dial.

19. The wearable device of claim 16, wherein the digital display is configured to display at least one sub-dial.

20. The wearable device of claim 16, comprising:
a touch screen; and
a touch wrist strap, wherein the touch screen, the touch wrist strap, and the bezel touch surface are to input gestures.

21. The wearable device of claim 20, wherein the gestures do not occlude the touch screen.

22. The wearable device of claim 20, wherein the touch screen outputs tactile feedback.

23. The wearable device of claim 16, wherein the bezel touch surface is to detect multi-finger touch.

24. The wearable device of claim 16, wherein the wearable device is coupled with a mobile device.

25. The wearable device of claim 16, wherein the wearable device is a pocket watch.

* * * * *